United States Patent Office 3,850,904
Patented Nov. 26, 1974

3,850,904
PSYCHOPHARMACOLOGICALLY ACTIVE D-GLU OR D-HIS CONTAINING PEPTIDES
Hendrick Marie Greven, Heesch, Netherlands, assignor to Akzona Incorporated, Asheville, N.C.
No Drawing. Filed May 14, 1973, Ser. No. 359,923
Claims priority, application Netherlands, May 24, 1972, 7206941
Int. Cl. A61k 17/06, 27/00; C07c 103/52
U.S. Cl. 260—112.5                5 Claims

ABSTRACT OF THE DISCLOSURE

The invention relates to psychopharmacologically active peptides and peptide derivatives of the general formula:

A-Glu(Q)-His-X            I in which one of the amino acid radicals Glu(Q) or His is present in the D-form, and
in which A represents: L-Met, L-Met($\rightarrow$O), L-Met($\rightarrow$O$_2$), desamino-Met, desamino-Met($\rightarrow$O), desamino-Met($\rightarrow$O$_2$) or the moiety: H$_2$N-B-Co-, in which B is a branched or unbranched alkylene group with 1–6 carbon atoms,
Q represents: the group OH or NH$_2$, and
X represents: a hydroxyl group, a (N-phenylalkyl)amino group, or the group L-Phe-Y, in which Y is a hydroxyl group, a (N-aminoalkyl)amino group, or the group L-Lys-Z, D-Lys-Z, L-Arg-Z, or D-Arg-Z, in which Z is a hydroxyl group, the group (N-$\beta$-indolylalkyl)amino, or the group L-Trp-OH, the group L-Phe-OH, a (N-phenylalkyl)amino group, in which the alkyl group contains 1–6 carbon atoms, the group L-Phe-Gly-OH or the group -L-Trp-Gly-OH, as well as the functional derivatives thereof.

The above peptides and peptide derivatives inhibit the extinction of conditioned avoidance response, that means that they can be used for the treatment of mental disorders, whereby a stimulation of the mental performance is desired.

---

The invention relates to peptides and peptide derivatives with highly active psychopharmacological properties.

From European Journal of Pharmacology 2, 14 (1967) certain peptide fragments of the natural adrenocorticotrophic hormones (ACTH) are known to inhibit the extinction of the conditioned avoidance response. Especially the peptide having the amino acid sequence 1–10 of ACTH proved to be active in this respect. Moreover it was found that the first three amino acids (Ser-Tyr-Ser) could even entirely be omitted without much loss of activity. The article ends with the conclusion that the pertide with the amino acid sequence 4–10 of ACTH, viz H-Met-Glu-His-Phe-Arg-Trp-Gly-OH, is the shortest peptide, and perhaps the key sequence for the said activity.

The peptide with the amino acid sequence 4–10 of ACTH does not only exert the psychopharmacological property mentioned above, but also a slight MSH activity, as usual in this type of ACTH fragments. Although the effect of a low dose administration of a MSH active peptide in men is still unknown, a search was done for peptides having at least the same psychopharmacological activity but no or a reduced MSH-activity.

In my co-pending Netherlands patent application 7202278 and corresponding U.S. application Ser. No. 331,945, filed Feb. 12, 1973, it is already disclosed that the N-terminal amino acid L-Met of the original 4–10 ACTH peptide can be replaced without any loss of activity, i.e. by L-Met($\rightarrow$O), L-Met($\rightarrow$O$_2$), desamino-Met, desamino-Met($\rightarrow$O), desamino-Met($\rightarrow$O$_2$), or the group: H$_2$N-B-CO-, in which B represents: a branched or unbranched alkylene group with 1–6 carbon atoms, such as glycyl, valyl, alanyl, $\beta$-alanyl or $\alpha$-methylalanyl.

Furthermore the co-pending Netherlands patent application 7203042 and corresponding U.S. application Ser. No. 337,507, filed Mar. 2, 1973, describes that the replacement of the C-terminal peptide radical -L-Trp-Gly-OH of the original 4–10 ACTH peptide by a group selected from L-Phe-OH, L-Phe-Gly-OH and the group

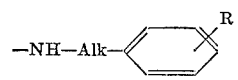

(N-phenylalkylamino-moiety) causes a considerable increase of the phychopharmacological activity.

Moreover the co-pending Netherlands patent application 7204422 states that a considerable increase of the psychopharmacological activity is obtained by replacing the amino acid L-Arginine or L-Lysine of the original 4–10 ACTH-peptide with the corresponding D-amino acid.

Surprisingly, it has now been found that an increase of the psychopharmacological activity can also be effected by replacing the amino acid radical L-Glu(Q) or L-His of the original 4–10 ACTH-peptide, or of any of the modified peptides, described in the co-pending Dutch and U.S. patent applications mentioned above, with the corresponding D-amino acid radical.

The present invention therefore comprises the manufacture and use of peptides and peptide derivatives of the general formula:

A-Glu(Q)-His-X            I in which one of the amino acid radicals Glu(Q) or His is present in the D-form, and
in which A represents: H-L-Met, H-L-Met($\rightarrow$O), H-L-Met($\rightarrow$O$_2$), desamino-Met, desamino-Met($\rightarrow$O), desamino-Met($\rightarrow$O$_2$) or the moiety: H$_2$N-B-CO, in which B stands for a branched or unbranched alkylene group with 1–6 carbon atoms,
Q represents: a hydroxyl or an amino moiety, and
X represents: a hydroxyl group, a (N-phenylalkyl)amino group, in which the alkyl group possesses 1–6 carbon atoms, or the group L-Phe-Y, in which Y represents a hydroxyl group, a (N-aminoalkyl)-amino group, the alkyl group of which possesses 2–6 carbon atoms, or the group L-Lys-Z, D-Lys-Z, L-Arg-Z or D-Arg-Z, in which Z is a hydroxyl group or a (N-$\beta$-indolylalkyl) amino group, the alkyl group of which may contain 1–6 carbon atoms, or the group L-Trp-OH, L-Phe-OH, a (N-phenylalkyl)amino group, the alkyl group of which contains 1–6 carbon atoms, the group L-Phe-Gly-OH or L-Trp-Gly-OH, as well as the functional derivative thereof.

The above-mentioned non-amino acid residues: (N-phenylalkyl)amino, (N-aminoalkyl)amino and (N-$\beta$-indolylalkyl)amino, are moieties that are chiefly distinguished from amino acid radicals by the absence of the carboxyl group.

By a (N-phenylalkyl)amino group is meant in this connection a moiety of the general formula:

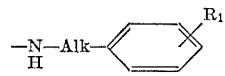

in which Alk represents a branched or unbranched alkylene group with 1–6 carbon atoms, and R$_1$ stands for hydrogen, halogen, hydroxy or an alkyl or alkoxy group with 1–4 carbon atoms.

By a (N-aminoalkyl)amino moiety is meant a group of the general formula:

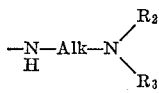

in which Alk represents a branched or unbranched alkylene group with 2–6 carbon atoms, $R_2$ represents hydrogen or alkyl with 1–4 C-atoms, and $R_3$ hydrogen, alkyl with 1–4 carbon atoms, or an amidine group.

A (N-β-indolylalkyl)amino group is a moiety of the general formula:

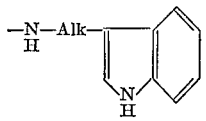

in which Alk represents a branched or unbranched alkylene group with 1–6 carbon atoms.

By replacing one of the amino acid radicals L-Glu or L-His of the original 4–10 ACTH peptide with the correspnding D-Glu or D-His amino acid radical the psychopharmacological activity observed generally rises by factor 3.

This modification introduced into the peptides described in the aforesaid Dutch co-pending patent applications causes a further increase of activity.

Special preference is given to peptides according to the invention in which the amino acid histidine occurs in the D-form, whether or not incombination with other modifications known from my co-pending patent applications.

Especially the following peptides were found to have potent psychopharmacological activities:

H-L-Met-L-Glu-D-His-L-Phe-L-Arg(or L-Lys)-L-Phe-OH,
desamino-Met-L-Glu-D-His-L-Phe-L-Arg(or L-Lys)-L-Phe-OH,
H-L-Met(→$O_2$)-L-Glu-D-His-L-Phe-L-Arg(or L-Lys)-Tra,
H-L-Met-L-Glu-D-His-L-Phe-L-Arg(or L-Lys)-Tra,
H-L-Met-L-Glu-D-His-L-Phe-L-Arg(or L-Lys)-PPA,
H-L-Met(→O)-L-Glu-D-His-L-Phe-L-Arg(or L-Lys)-L-Phe-OH,
H-L-Met-D-Glu-L-His-L-Phe-L-Arg(or L-Lys)-L-Phe-OH,
H-β-Ala-L-Glu-D-His-L-Phe-L-Arg(or L-Lys)-L-Phe-OH,
desamino-Met-L-Glu-D-His-L-Phe-L-Arg(or L-Lys)-Tra
and the corresponding sulfoxide and sulfone, H-L-Met-L-Glu-D-His-L-Phe-D-Lys-L-Phe-OH and the corresponding sulfoxide and sulfone.

The peptides and peptide derivatives according to the invention are prepared by a process commonly used in peptide-chemistry. The processes that are employed usually for the manufacture of the present compounds can be summarized as follows:

(a) condensation of a compound (amino acid, peptide) having a free carboxyl group and protected other reactive groups, with a compound (amino acid, peptide or amine) having a free amino group and protected other reactive groups, in the presence of a condensation agent;

(b) condensation of a compound (amino acid, peptide) having an activated carboxyl group and optionally protected other reactive groups, with a compound (amino acid, peptide, amine) having a free $NH_2$ group and optionally protected other reactive groups;

(c) condensation of a compound (amino acid, peptide) having a free carboxyl group and optionally protected other reactive groups, with a compound (amino acid, peptide, amine) having an activated amino group and optionally protected other reactive groups, after which the protecting groups are removed, if necessary.

Activation of the carboxyl group can be effected, for example, by converting the carboxyl group into an acid halide, an azide, anhydride, imidazolide, or an activated ester such as the N-hydroxy-succinimido ester, or the p-nitro-phenyl ester.

The amino group can be activated by converting it into a phosphite amide or by the "phosphor-azo" method.

Methods usually employed for the above condensation reactions are: the carbodiimide method, the azide method, the mixed anhydride method and the method of the activated esters as described in "The Peptides," vol. I, 1965 (Acad. Press), by E. Schröder and K. Lübke. Moreover Merrifield's so-called Solid Phase Method, described in J. Am. Chem. Soc. 85, 2149 (1963), can be applied for the manufacture of the present peptides and peptide derivatives.

The reactive groups that are not allowed to participate in the condensation reaction are protected effectively by the so-called protecting groups, which can be easily removed again, by hydrolysis or reduction. Thus, for example, a carboxyl group can be protected effectively by esterification with methanol, ethanol, tertiary butanol, benzylalcohol or p-nitrobenzylalcohol, or by conversion into an amide. This latter protecting group is very hard to remove, however, so that it is recommendable to use this group only to protect the carboxyl group of the C-terminal amino acid in the ultimate peptide or the γ-carboxyl group of glutamic acid. In this case the peptide synthesis leads direct to the amide of a peptide according to formula I.

Groups that are capable of protecting an amino group effectively are usually acid groups, for example an acid group derived from an aliphatic, aromatic, araliphatic or heterocyclic carboxylic acid such as acetic acid, benzoic acid, or pyridine-carboxylic acid, or an acid group derived from carbonic acid such as the group ethoxy-carbonyl, benzyloxy-carbonyl, t-butyloxy-carbonyl or p-methyloxy-benzyloxy-carbonyl, or an acid group derived from a sulfonic acid, such as the group benzene-sulfonyl or p-toluene-sulfonyl, but also other groups can be employed, such as substituted or unsubstituted aryl or aralkyl groups, for example benzyl and triphenylmethyl, or groups such as ortho-nitro-phenyl-sulfenyl and 2-benzoyl-1-methyl-vinyl.

It is mostly recommendable also to protect the guanidine group of arginine, the ε-amino group of lysine, and the imidazole group of histidine, but this protection is not absolutely necessary. Conventional protecting groups in this connection are a tertiary butyloxy-carbonyl, or a tosyl group for the ε-amino group of lysine, a nitro group for the guanidine group of arginine, and a benzyl, dinitrophenyl or a trityl group for the imidazole group of histidine.

The protecting groups can be split off by various conventional methods, depending upon the nature of the group in question, for example with trifluoro acetic acid, or by mild reduction, for example with hydrogen and a catalyst, such as palladium, or with HBr in glacial acetic acid.

Peptides according to the present invention having as the N-terminal moiety a methionylsulfoxide or desamino-methionylsulfoxide group, may be prepared from the corresponding Met- or Desamino-Met peptide by means of a mild oxidation known per se, for example with dilute hydrogenperoxide or a peracid. This oxidation yields a mixture of the S- and R-sulfoxide (=d- or l-sulfoxide), which mixture may be separated into the separate diastereomeric compounds in a conventional manner.

By coupling the S- or R-sulfoxide (=d- or l-sulfoxide) of methionine or desaminomethionine with the peptide H-Glu(Q)-His-X, in which either Glu(Q) or His occurs in the D-form and Q and X have the meanings indicated above, the separate enantiomers can also be obtained in a direct way.

The peptides according to the invention having as the N-terminal residue a methionylsulfone (Met→$O_2$) or desaminomethionylsulfone (desamino - Met→$O_2$) group may be prepared most conveniently by an oxidation known per se of the corresponding Met- or Desamino-Met peptide, for example with $H_2O_2$ or a peracid.

By functional derivatives of the peptides and peptide-derivatives according to the invention are meant:

(1) The pharmaceutically acceptable acid addition salts of the peptides and peptide derivatives, (2) Peptides or peptide derivatives in which one or more free amino groups have been substituted by an acyl group derived from an aliphatic carboxylic acid with 1–6 carbon atoms, such as an acetyl group, (3) Unsubstituted amides or lower alkyl (1–6 C) substituted amides of those peptides and peptide derivatives according to the invention having a free carboxyl group, (4) Esters of the present peptides derived from aliphatic or araliphatic alcohols with 1–18 carbon atoms; in particular, the lower aliphatic (1–6 C) alcohols, such as methanol, ethanol, butanol, pentanol or cyclohexanol, and the lower araliphatic (7–10 C) alcohols, such as benzylalcohol, phenylethylalcohol, phenylpropylalcohol, or cinnamylalcohol, (5) Metal complexes formed by contacting the peptides or peptide derivatives with a sparingly soluble salt, hydroxide or oxide of a metal, preferably zinc, or preparations obtained by associating the present peptides with organic, mostly polymeric, compounds, such as gelatine, polyphloretinphosphate or polyglutamic acid, to obtain a prolonged mode of action.

The acid addition salts are obtained by reacting the present compounds with a pharmaceutically acceptable organic or inorganic acid, such as HCl, phosphoric acid, acetic acid, maleic acid, tartaric acid, or citric acid.

As already briefly said the present peptides and peptide derivatives as well as their functional derivatives defined above have valuable psychopharmacological activities. The present compounds inhibit the extinction of conditioned avoidance response, that means that they can be used, in general, as antidepressant agents. More particularly they can be used for the treatment of certain mental disorders whereby a stimulation of the mental performance is desired, such as in certain types of neurosis and in old-age infirmities (senility).

The compounds according to the invention can be administered parenterally, orally, sublingually, rectally or intranasally. Preferably the peptides are placed in a form suitable for parenteral administration, for which purpose they are dissolved, suspended or emulsified in a suitable liquid. However, mixed with suitable auxiliaries and/or fillers the peptides may also be placed in a form suitable for oral, sublingual, rectal or intranasal administration.

The peptides or peptide derivatives according to the invention are preferably administered parenterally in a daily dosage of from 0.01 μg. to 100 μg. per kg. body weight, dependent upon the peptide's activity level. For oral, sublingual, rectal or intranasal administration the daily dosage may be considerably higher, preferably from 0.1 mg. to 100 mg. per kg. body weight.

Exceedingly valuable preparations are obtained if the present peptides are placed in a form in which they have a prolonged activity, for example, incorporated into gelatin, polyphloretinphospate or polyglutamic acid, or preferably as metal complexes. These metal complexes can be obtained by contacting the peptides with sparingly soluble metal salts, metal hydroxides or metal oxides. As sparingly soluble metal salts the metal phosphates, metal pyrophosphates and metal polyphosphates are commonly used.

Metals that can be used in this process are the metals belonging to the b-groups of the periodic system, for example cobalt, nickel, copper, iron, and preferably zinc, as well as the metals belonging to the main groups of the periodic system and capable of forming complexes, such as magnesium and aluminum. The preparation of the said metal complexes takes place in the conventional manner.

Thus, for example, a metal complex can be obtained by adding the peptide and a poorly soluble metal salt, metal hydroxide or metal oxide to an aqueous medium. The metal complex can also be obtained by adding an alkaline medium to an aqueous solution of the peptide and an insoluble metal salt to form the insoluble peptide-metal hydroxide complex.

Moreover, the metal complex can be obtained by adding the peptide, a soluble metal salt and a soluble salt to an aqueous, preferably alkaline medium to form an insoluble peptide/metal salt complex in situ.

The metal complexes can be employed at once as suspensions, or for example be lyophilized and afterwards suspended again.

*Biological activity.*—Extinction of the conditioned avoidance response

Male white rats weighing approximately 150 grams were conditioned by means of the so-called pole-jumping test. The conditioned stimulus was a light presented over the cage for 5 seconds, whereupon the unconditioned stimulus of shock was delivered through the grid floor of the cage.

For 3 consecutive days 10 tests were run every day with an average interval of 60 seconds. The day after this acquisition period the extinction was studied in sessions of 10 trials. All animals that made 8 or more positive responses in the first extinction session were treated with the substance to be tested or with a placebo. After that, extinction sessions of 10 trials each were carried out 2 and 4 hours after the treatment of the animals with the substance to be tested.

In the following table the results of the known peptide 4–10 ACTH are compared with some peptides according to this invention.

| Peptide | Dosage in μgm. per animal (s.c.) | First session, 0 hour | Second session after 2 hrs. | Third session after 4 hrs. | Estimated potency ratio compared with 4–10 ACTH (±1) |
|---|---|---|---|---|---|
| H-Met-Glu-D-His-Phe-Arg-Trp-Gly-OH (4–10 ACTH) | 100 | 8 | 8 | 7 | 1 |
| | 30 | 9 | 7 | 5 | |
| | 10 | 9 | 6 | 3 | |
| H-Met-Glu-D-His-Phe-OH | 10 | 9 | 9 | 6 | >3 |
| | 3 | 8 | 6 | 3 | |
| H-Met-D-Glu-His-OH | 30 | 8 | 8 | 8 | 1–3 |
| | 10 | 8 | 6 | 4 | |
| H-Met-Glu-D-His-PPA | 10 | 9 | 7 | 5 | 3 |
| | 3 | 8 | 6 | 3 | |
| H-Met-Glu-D-His-Phe-Lys-Phe-OH | 3 | 9 | 9 | 6 | >10 |
| | 1 | 8 | 6 | 4 | |

TABLE—Continued

| Peptide | Dosage in μgm. per animal (s.c.) | First session, 0 hour | Second session after 2 hrs. | Third session after 4 hrs. | Estimated potency ratio compared with 4-10 ACTH(±1) |
|---|---|---|---|---|---|
| H-Met-Glu-D-His-Phe-Lys-Tra | 1<br>0.3 | 9<br>8 | 9<br>6 | 7<br>4 | 50 |
| H-Met-D-Glu-His-Phe-Lys-Phe-OH | 10<br>3 | 10<br>9 | 9<br>7 | 9<br>7 | >10 |
| H-Met-Glu-D-His-Phe-Lys-PPA | 10<br>3 | 9<br>9 | 8<br>7 | 8<br>7 | >10 |
| H-Met(→O)-Glu-D-His-Phe-Lys-Phe-OH | 0.3<br>0.1 | 9<br>8 | 7<br>6 | 6<br>4 | 100 |
| H-β-Ala-Glu-D-His-Phe-Lys-Phe-OH | 1<br>0.3 | 9<br>9 | 9<br>6 | 7<br>3 | 50 |
| H-Met-Glu-D-His-Phe-Lys-Trp-OH | 10<br>3 | 9<br>8 | 9<br>6 | 6<br>3 | 3 |
| H-Met-D-Glu-His-Phe-Lys-Trp-OH | 30<br>10 | 8<br>9 | 8<br>8 | 7<br>3 | 1-3 |

With regard to the various abbreviations used throughout the specification and examples, the following remarks are made:

(I) If no optical configuration has been stated the L-form is meant.

(II) The following abbreviations have been used for the protecting or activating groups:

Z=benzyloxy-carbonyl
Boc=tertiary butyloxy-carbonyl
ONB=nitrobenzyloxy
tBu=tertiary butyl
Bzl=benzyl
Me=methyl
ONP=p-nitrophenyloxy
Su=succinimido (III) For the solvents or reagents the following abbreviations have been used:

Bz=benzene
To=toluene
EtOH=ethanol
Bu=butanol
Py=pyridine
Ac or Hac=acetic acid
Fo=formic acid
Am=amyl alcohol
iPro=isopropanol
DMF=dimethylformamide
THF=tetrahydrofuran
DCCI=dicyclohexyl-carbodiimide
DCHU=dicyclohexyl-ureum
TAA=triethylamine
TFA=trifluoroacetic acid
Wa=water (IV) For the amino acid the following abbreviations have been used:

Met=methionyl
Met(→O)=methionylsulfoxide (rac.)
Met(d→O)=methionyl(d)sulfoxide
Met(l→O)=methionyl(l)sulfoxide
Met(→$O_2$)=methionylsulfone
Glu(Q) or Glu=glutamyl (Q=OH)
Glu(Q) or Gln=glutaminyl (Q=$NH_2$)
His=histidyl
Phe=phenylalanyl
Arg=arginyl
Lys=lysyl
Gly=glycyl
Val=valyl
Ala=alanyl
β-Ala=β-alanyl
(α-Me)Ala=α-methylalanyl (V) Abbreviations used for other residues:

Amf=(N-1-phenylisopropyl)amino group (derived from amphetamine)
Tra=(N-β-indolylethyl)amino group (derived from tryptamine)
PEA=(N-phenylethyl)amino group
PPA=(N-phenylpropyl)amino group
HPEA=(N-p.hydroxy-phenylethyl)amino group
Desamino-Met=desamino-methionyl (or γ-methylthiobutyryl)
Desamino-Met(→O)=desamino-methionyl sulfoxide
Desamino-Met(→$O_2$)=desamino-methionyl sulfone.

PREPARATION STARTING SUBSTANCES (A) Synthesis Boc-Met-D-Glu(OtBu)-His $N_2H_3$ (1) Z-D-Glu(OtBu)-His-OMe:

Z-D-Glu(OtBu)-OH (6.62 g.) is dissolved in 30 ml. of acetonitril. This solution is cooled down to 0° C., after which 5.32 g. of H-His-OMe 2 HCl in 30 ml. of cooled acetonitril and 2 equiv. TAA are added, after which at 0° C. 4.62 g. of DCCI in 15 ml. of acetonitril are added. The mixture is stirred for 2 hours at 0° C. and left to stand for 20 hours at 0° C., after which the resulting precipitate is filtered off and the filtrate evaporated in vacuum.

The residue is dissolved in ethyl acetate, washed with sodium bicarbonate and saliferous water and dried. The solvent is distilled off in vacuum. The resulting oil is chromatographed over $SiO_2$ (solvent mixture Bz:EtOH =8:2).

Yield: 3.5 g. of oil (foam). Rf in Bz:EtOH (8:2)=0.57 on $SiO_2$.

(2) H-D-Glu(OtBu)-His-OMe.2 HCl:

Of the oil obtained above 2.9 g. are dissolved in 50 ml. of methanol. After the addition of 3.25 ml. of 4 N HCl and 600 mg. of Pd/C 10%, hydrogen is bubbled through the mixture. After 2.5 hours the mixture is filtered and the filtrate evaporated.

Yield: 2.35 g. Rf in Am:Fo:Wa (7:2:1)=0.33 on $SiO_2$.

(3) Boc-Met-D-Glu(OtBu)-His-OMe:

Boc-Met$N_2H_3$ (1.59 g.) is dissolved in 15 ml. of DMF. This solution is cooled down to 0° C., after which 2.6 ml. of 4.85 N HCl/THF are added and at −20° C. 0.82 ml. of isoamyl nitrite. The mixture is stirred for 5 minutes at −20° C., after which the azide which has formed meanwhile, is added to a solution of 2.35 g. of H-D-Glu(OtBu)-His-OMe.2 HCl (A.2) in 20 ml. of DMF.

Then TAA is added to obtain pH 7.2.

The reaction mixture is stirred for 70 hours, after which it is filtered and the filtrate evaporated to dryness. The residue is dissolved in aqueous ethyl acetate and washed with water. The organic phase is dried, after which the ethyl acetate is evaporated to 15 ml. and diluted with 60 ml. of petroleum ether. After one day the clear solution is evaporated to dryness.

Yield: 2.63 g. of oil (foam). Rf in Bu:Ac:Wa (4:1:1) =0.76 on $SiO_2$.

(4) Boc-Met-D-Glu(OtBu)-His-$N_2H_3$:

2.6 g. of ester (A.3) are dissolved in 50 ml. of methanol, after which 2.6 ml. of hydrazine hydrate are added.

The reaction mixture is stirred for 5 hours, after which it is evaporated and set aside under ether at 0° C.

After the mixture has been left to stand for 24 hours, the resulting precipitate is filtered off.

Yield: 2.1 g. Rf in Am:iPro:Wa (10:4:5)=0.36 on $SiO_2$.

(B) In the same way as described in A are prepared:

Boc-Ala-D-Glu(OtBu)-His-$N_2H_3$: Rf*=0.31
Boc-β-Ala-D-Glu(OtBu)-His-$N_2H_3$: Rf=0.36
Desamino-Met-D-Glu(OtBu)-His-$N_2H_3$: Rf=0.47
Boc-Val-D-Glu(OtBu)-His-$N_2H_3$: Rf=0.33
Boc-(α-MeAla-D-Glu(OtBu)-His-$N_2H_3$: Rf=0.32
Boc-Gly-D-Glu(OtBu)-His-$N_2H_3$: Rf=0.30

(C) Synthesis Boc-Met-Glu(OtBu)-D-His-$N_2H_3$ (1) Z-Glu(OtBu)-D-His-OMe:

Z-Glu(OtBu)-OH (66.2 g.) is dissolved in 115 ml. of acetonitril. After the addition of 50 g. of H-D-His-OMe.2 HCl in 115 ml. of acetonitrile, the solution is cooled to 0° C., after which 58 ml. of TAA are added and at 0° C. 38.8 g. of DCCI.

The mixture is stirred for 22 hours at 0° C., after which it is filtered and the filtrate evaporated in vacuum, after which the residue is taken up in ethyl acetate. The organic phase is washed with a 5% sodium bicarbonate solution in water and water. After the addition of 575 ml. of ether and 115 ml. of petroleum ether the mixture is extracted 4 times with 100 ml. of 1 N HCl. After neutralizing the acid water extract with 1 N sodium hydroxide (final pH 8.5) the mixture is extracted again with ethyl acetate.

The organic layer is washed 3 times with saliferous water, dried and evaporated to 400 ml. After the addition of 575 ml. of ether and 116 ml. of petroleum ether, the dipeptide crystallizes out.

Melting point 73–76° C. Rf in Am:Py:Wa (5:3:2) = 0.60 on $SiO_2$.

(2) Z-Glu(OtBu)-D-His-$N_2H_3$:

47.7 g. of the ester from (1), dissolved in 336 ml. of methanol, are converted into the hydrazide by adding 12.5 ml. of hydrazine hydrate, after which the mixture is stirred at 0° C. for 48 hours. Then the mixture is evaporated to 100 ml., after which 475 ml. of distilled cold water are added. After filtration the above peptide is obtained.

Melting point: 178–181° C.

(3) H-Glu(OtBu)-D-His-OMe.2 HCl:

Hydrogenation of 5.8 g. of dipeptide (C.1) as described in A.2, yields the dipeptide H-Glu(OtBu)-D-His-OMe.2HCl in 94% yield.

Rf in Am:Fo:Wa (7:2:1)=0.32 on $SiO_2$.

(4) Boc-Met-Glu(OtBu)-D-His-OMe:

Boc-Met-$N_2H_3$ (1.59 g.) is converted into the azide as described in A.3, and coupled to 2.35 g. of H-Glu(OtBu)-D-His-OMe.2HCl (C3).

The reaction mixture is stirred for 86 hours, after which it is evaporated to dryness.

The residue is taken up in aqueous ethyl acetate and washed 4 times with water. The residue is dried, after which the ethyl acetate is evaporated to dryness. The oily residue weighs 2.4 g.

Rf in Bu:Ac:Wa (4:1:1)=0.74 on $SiO_2$.

(5) Boc-Met-Glu(OtBu)-D-His-$N_2H_3$:

The tripeptide (C.4) is converted into the hydrazide in the manner described before. The hydrazide obtained is dissolved in methanol and poured out into the tenfold quantity of water.

Yield: 1.3 g. Rf in Am:iPro:Wa (10:4:5)=0.35 on $SiO_2$.

(D) Other D-His-peptides (1) Boc-A-Glu-OtBu)-D-His-$N_2H_3$ (A=β-Ala, desamino-Met,Gly,(α-Me)Ala, Val or Ala):

(a) Boc-β-Ala-Glu(OtBu)-D-His-OMe:

Boc-β-Ala-$N_2H_3$ (0.61 g.) is dissolved in 10 ml. of DMF, after which the solution is cooled to 0° and 1.3 ml. of 4.85 N HCl/THF are added. The mixture is cooled down to −21°, after which 0.41 ml. of isoamyl nitrite is added. The mixture is stirred for 7 minutes, after which the azide has formed. The azide solution is added to a pre-cooled solution of 1.2 g. of H-Glu(OtBu)-D-His-OMe.2 HCl in 10 ml. of DMF.

The reaction mixture is adjusted with TAA to pH 7.2, stirred for 86 hours at 0° and evaporated to dryness. The oily residue is chromatographed over $SiO_2$.

Yield: 0.9 g. Rf in Bu:Ac:Wa (4:1:y)=0.73 on $SiO_2$.

(b) Boc-β-Ala-Glu(OtBu)-D-His-$N_2H_3$:

Conversion of 0.75 g. of ester into hydrazide is performed in the same way as described in A.4.

Yield: 0.7 g. Rf in Am:iPro:Wa (10:4:5)=0.29 on $SiO_2$.

(c) In the same way are prepared:

Desamino-Met-Glu(OtBu)-D-His-$N_2H_3$
Boc-Gly-Glu(OtBu)-D-His-$N_2H_3$
Boc-(α-Me)Ala-Glu(OtBu)-D-His-$N_2H_3$
Boc-Val-Glu(OtBu)-D-His-$N_2H_3$
Boc-Ala-Glu(OtBu)-D-His-$N_2H_3$.

(2) Boc-Met-Gln-D-His-$N_2H_3$:

In the same manner as described in C the amino acid derivative Boc-Met-$N_2H_3$ is coupled to H-Gln-D-His-OMe, obtained from the corresponding Z-protected peptide by hydrogenation with 10% palladium on charcoal, yielding the protected peptide ester: Boc-Met-Gln-D-His-OMe, which peptide is immediately processed into the corresponding hydrazide.

Rf in Am:iPro:Wa (10:4:5)=0.27 on $SiO_2$.

(E) H-Phe-D-Arg-Oh (1) Z-Phe-D-Arg($NO_2$)-OMe:

A solution of 12.8 g. of H-D-Arg($NO_2$)-OMe.HCl in 200 ml. of DMF is cooled down to +5° C., after which 4.8 g. of TAA are added. The resulting triethylamine.HCl is filtered off, after which 20 g. of Z-Phe-ONP are added. The mixture is stirred for 4 days at room temperature, after which part of the DMF is distilled off and the residue diluted with 400 ml. of ethyl acetate/water. The organic phase is washed with citric acid, ammonium-hydroxide and water, after which the ethyl acetate layer is dried and evaporated.

After recrystallization from ethyl acetate/petroleum-ether the melting point obtained is 89–93° C. Rf in Bz:EtOH (8:2)=0.62 on $SiO_2$.

(2) Z-Phe-D-Arg($NO_2$)-OH:

Of the above dipeptide 5 g. are dissolved in dioxane and then saponified with 1.1 equiv. sodium hydroxide. After 2 hours' stirring, this solution is acidified with 1 N hydrochloric acid (pH=2) and diluted with a tenfold quantity of water. The resulting precipitate is stirred for 3 hours at 0° and filtered off.

Yield: 3.1 g. Melting point=118–121° C. (dec.).

Rf in Bz:EtOH (8:2)=0.11 on $SiO_2$.

(3) H-Phe-D-Arg-OH.acetate:

One gram of the Z-Phe-D-Arg($NO_2$)-OH (from 2) is dissolved in 20 ml. of 90% acetic acid, after which 100 mg. of palladium 10% on carbon are added. After hydrogen has been bubbled through, the black reaction mixture is filtered over hyflo, the filtrate evaporated to dryness and the residue dissolved in t-butanol/water (1:1) and lyophilized.

Yield: 0.4 g. of dipeptide acetate.

Rf in Bu:Py:Ac:Wa (4:3/4:1/4:1)=0.21 on $SiO_2$.

(4) In the same as described in (3) the Z-Phe-D-Arg($NO_2$)-OMe (from (1) is converted into the H-Phe-D-Arg-OMe.acetate.
$Rf$ in Bu:Py:Ac:Wa (4:3/4:1/4:1)=0.40 on $SiO_2$.

(F) H-Phe-Lys(Boc)-OtBu

Coupling of 4.2 g. of Z-Phe-ONP with H-Lys(Boc)-OtBu in the way described in E.1 gives the dipeptide Z-Phe-Lys(Boc)-OtBu as a viscous oil.
$Rf$ in Bz:EtOH (9:1)=0.57 on $SiO_2$. Yield: 79%.
The dipeptide H-Phe-Lys(Boc)-OtBu is obtained in 95% yield by hydrogenating the peptide Z-Phe-Lys(Boc)-OtBu in methanol with 10% palladium on charcoal.
$Rf$ in Bu:Ac:Wa (4:1:5)=0.41 on $SiO_2$.

(G) H-Phe-D-Lys(Boc)-OH (1) Z-Phe-D-Lys(Boc)-OBzl:
Starting from 17.7 g. of H-D-Lys(Boc)-OBzl.HCl the dipeptide Z-Phe-D-Lys(Boc)-OBzl is prepared in the same way as described in E.1.
Yield after evaporation of the ethyl acetate: 72% (oil).
$Rf$ in Bz:EtOH (9:1)=0.54 on $SiO_2$.

(2) H-Phe-D-Lys(Boc)-OH:
Two grams of Z-Phe-Lys(Boc)-OBzl are dissolved in 50 ml. of methanol, after which 0.4 g. of palladium 10% on charcoal is added and hydrogen is bubbled through the mixture. After 5 hours filtration takes place, and the filtrate is evaporated to dryness.
$Rf$ in Bu:Py:Ac:Wa (4:3/4:1/4:1)=0.31 on $SiO_2$.

(H) H-Phe-N-$(CH_2)_5$-N-Boc
   H               H

Condensation of Z-Phe-ONP and

Boc-N-$(CH_2)_5$-$NH_2$
   H in ethyl acetate gives

Z-Phe-N-$(CH_2)_5$-N-Boc
   H               H

Melting point: 131–133° C. After hydrogenation in methanol the

H-Phe-N-$(CH_2)_5$-N-Boc
   H               H is obtained. $Rf$ in Bu:Ac:Wa (4:1:5)=0.23.

(K) H-Phe-Lys(Boc)-Trp-OH and derivatives (1) Z-Phe-Lys(Boc)-Trp-OH:
Z-Phe-ONP (4.6 g.) is dissolved in 60 ml. of DMF. H-Lys(Boc)-Trp-OMe (4.4 g.) is added, after which the mixture is stirred at 20° C. for 20 hours. Then 0.2 g. of 2-dimethylamino-ethylamine is added. The reaction mixture is stirred for another 2 hours and then evaporated. The residue is dissolved in 250 ml. of ethylacetate/water. This solution is successively washed with a solution of 5% potassium carbonate in water, 0.5 N hydrochloric acid and water, after which the organic phase is dried on sodium sulphate.
After filtration the filtrate is evaporated to dryness and the oily residue saponified at once in dioxane. For this purpose 6.54 g. of ester are dissolved in 100 ml. of dioxane, after which 11.8 ml. of 1.5 N NaOH are added. After 2 hours' stirring the resulting reaction mixture is acidified with 1.5 N hydrochloric acid to pH 7, after which the dioxane is distilled off in vacuum.
To the residue ethylacetate/water is added and the water layer adjusted to pH 2 with dilute hydrochloric acid, without the layers being separated. The organic phase is washed with water and then dried. The ethyl acetate is distilled off in vacuum to obtain an oil, which becomes solid after being stirred in ether.
$Rf$ in Am:Py:Wa (5:3:2)=0.82 on $SiO_2$.

(2) H-Phe-Lys(Boc)-Trp-OH.HCl:
Of the tripeptide acid from (1) 1.85 g. are dissolved in 40 ml. of DMF and 1 equiv. hydrochloric acid. Palladium 10% on charcoal (350 mg.) is added, after which hydrogen is bubbled through the mixture for 6 hours. After the reduction the catalyst is filtered off and the filtrate immediately processed further.
$Rf$ in Am:Py:Wa (5:3:2)=0.72 on $SiO_2$.

(3) Z-Phe-Lys(Boc)-Trp-$NH_2$ or Z-Phe-Lys(Boc)-Trp-$N(CH_3)_2$:
Two grams of the crude ester (see 1) are added to 25 ml. of a 10 N ammonia solution or dimethylamine solution in methanol. The mixture is stirred for 2 days and after that it is evaporated to dryness and the residue recrystallized from methanol.
$Rf$ in Bz:EtOH (8:2)=0.35 on $SiO_2$ for the amide and 0.43 for the dimethylamide.

(4) Z-Phe-Lys(Boc)-Trp-$OC_{11}H_{23}$:
Z-Phe-Lys(Boc)-Trp-OH (from 1), 3.6 g., are dissolved in 45 ml. of DMF. Then 1.35 g. of undecyl bromide and 1.0 g. of dicyclohexylamine are added. The mixture is stirred at 35° for 48 hours and at 0° C. for 2 hours. The dicyclohexylammonium bromide formed is filtered off and the filtrate evaporated to dryness in vacuum. The residue is taken up in ethyl acetate, washed with 0.1 N HCl, water, a 10% sodium bicarbonate solution and water. The organic phase is dried for a short time on sodium sulphate, then partly evaporated in vacuum and crystallized by adding n.hexane.
$Rf$ in Bz:EtOH (8:2)=0.48 on $SiO_2$.

(5) In the same day as described in K.2 one gram of the tripeptides prepared in (3) and (4) is hydrogenated:
In this way are obtained the hydrochlorides of:

H-Phe-Lys(Boc)-Trp-$NH_2$: $Rf$ *=0.76 on $SiO_2$
H-Phe-Lys(Boc)-Trp-$N(CH_3)_2$: $Rf$ *=0.77 on $SiO_2$
H-Phe-Lys(Boc)-Trp-$OC_{11}H_{23}$: $Rf$ *=0.80 on $SiO_2$ (L) H-Phe-Arg-Trp-OH (1) Boc-Arg($NO_2$)-Trp-ONB:
Boc-Arg($NO_2$)-OH (5.76 g.) is dissolved in 70 ml. of DMF and 2.52 ml. of triethylamine. This solution is cooled down to −10° C., after which 2.38 ml. of isobutylchloroformate are added and the mixture is stirred at −10° C. for 10 minutes. To this solution a solution of 6.14 g. of H-Trp-ONB.HCl in 40 ml. of cooled DMF and 3.01 ml. of triethylamine is added. The mixture is stirred for 30 minutes at −10°, for 3 hours at 0° and for 20 hours at 20° C., after which the solvent is evaporated in vacuum and the residue taken up in ethyl acetate/water (10:1). The organic phase is washed with water, 5% sodium bicarbonate and water, dried and evaporated to dryness in vacuum.
Yield: 8.5 g. of oil. $Rf$ in Bz:EtOH (8:2)=0.79 on $SiO_2$.

(2) H-Arg($NO_2$)-Trp-ONB:
One gram of the peptide prepared in (1) is dissolved in 20 ml. of methylene chloride, after which hydrogen chloride gas is bubbled through the solution while cooling. After 1 hour's stirring the precipitate is filtered off and thoroughly washed with dry methylene chloride. The precipitate is immediately processed further.
$Rf$ in Am:Py:Wa (5:3:2)=0.66 on $SiO_2$. ($Rf$ starting substance 0.93).

(3) Z-Phe-Arg($NO_2$)-Trp-ONB:
Three grams of the dipeptide from (2) are dissolved in 20 ml. of DMF. After cooling this solution to 0° C., 1.12 ml. of TAA and 2.12 g. of Z-Phe-ONP are added. The reaction mixture is stirred at 0° C. for 2 hours and at 20° C. for 20 hours, and then evaporated in vacuum. The oily residue is dissolved in ethyl acetate/water (10:1) and processed as described in (1). The organic phase is evaporated and the residue dissolved 5 ml. of methanol and gently added to 100 ml. of dry ether to precipitate the peptide.
Yield: 2.9 g. $Rf$ in Bz:EtOH (8:2)=0.48 on $SiO_2$.

(4) H-Phe-Arg-Trp-OH:
Two grams of the above-mentioned peptide from (3) are dissolved in 40 ml. of acetic acid, after which 400 mg.

of 10% palladium on charcoal are added and the mixture is hydrogenated for 2 days (Parr).

After filtration the acetic acid is evaporated in vacuum, after which the residue is stirred into dry ether. Yield: 98%. The reddish foam is dried over solid potassium hydroxide. The substance contains 1.1 molecule of acetic acid.

Rf in Am:Py:Wa (5:3:2)=0.17 on $SiO_2$.

(M) H-Phe-Arg-Tra (1) Boc-Arg($NO_2$)-Tra:

Boc-Arg($NO_2$)-OH (5.76 g.) is dissolved in 70 ml. of DMF and 2.52 ml. of TAA. This solution is cooled down to −10° C., after which 2.38 ml. of isobutylchloroformate are added and the mixture is stirred at −10° C. for another 10 minutes. To this solution a solution of 2.9 g. of tryptamine in 10 ml. of DMF are added, the temperature being maintained at about −10° C. The mixture is stirred for 30 minutes at −10° C., for 2 hours at 0° and for 18 hours at 20°, after which the solvent is evaporated off in vacuum and the residue taken up in ethyl acetate/water. The organic phase is washed with water, bicarbonate (5%) and water, after which it is dried and evaporated.

Yield: 7.4 g. oil. Rf in Bz:EtOH (8:2)=0.54 on $SiO_2$.

(2) Z-Phe-Arg($NO_2$)-Tra and H-Phe-Arg-Tra:

Z-Phe-ONP (2.1 g.) is dissolved in 10 ml. of DMF and 10 ml. of ethyl acetate. Then 1.81 g. of H-Arg($NO_2$)-Tra (obtained by deprotection of the amide from (1)) are added, after which the mixture is stirred for 30 minutes at −10° C. and for 20 hours at 20° C.

The reaction mixture is processed as described in L.3. Yield: 1.3 g.; melting point 131–133° C. Rf in Bz:EtOH (8:2)=0.47 on $SiO_2$.

Of the compound obtained 1.3 g. are converted into H-Phe-Arg-Tra by means of 10% palladium on charcoal and hydrogen (Parr). Yield: 72%.

(N) H-Phe-Lys(Boc)-Tra (1) Z-Phe-Lys(Boc)-Tra:

Starting from 3.4 g. of Z-Phe-ONP and 3 g. of H-Lys(Boc)-Tra (prepared from Z-Lys(Boc)-Tra; melting point 77–80° C.) Z-Phe-Lys(Boc)-Tra is obtained in the way described in E.1.

Yield: 65%. Melting point: 125–129° C. Rf in Bz:EtOH (8:2)=0.70 on $SiO_2$.

(2) H-Phe-Lys(Boc)-Tra:

Two grams of the peptide from (1) are dissolved in 25 ml. of methanol and hydrogenated with hydrogen in the presence of 10% palladium on charcoal, in a conventional manner. After evaporation to dryness a foam is obtained. Yield: 95%.

Rf in Bu:Ac:Wa (4:1:1)=0.80 on $SiO_2$.

(O) H-Phe-Lys(Boc)-Phe derivatives (1) Z-Phe-Lys(Boc)-Phe-OMe:

H-Lys(Boc)-Phe-OMe (4.24 g.) is dissolved in 25 ml. of dimethylformamide, after which 4.77 g. (11.4 mmol) of Z-Phe-ONP are added to this solution. The mixture is stirred for about 24 hours, after which the solvent is evaporated off in vacuum. The residue is dissolved in a mixture of 120 ml. of ethyl acetate and 30 ml. of water, after which the ethyl acetate phase is washed successively with 0.1 N HCl, water, a sodium carbonate solution (5%) and water. The ethyl acetate in distilled off and the residue recrystallized from ethyl acetate, to which a little petroleum ether has been added.

Rf is Bz:EtOH (8:2)=0.76 on $SiO_2$.

(2) H-Phe-Lys(Boc)-Phe-OMe:

Of the peptide obtained in (1) 1.9 g. are dissolved in 50 ml. of methanol. To this solution 0.5 g. of 10% palladium on carbon is added. Then hydrogen gas is bubbled through the mixture, after which the catalyst is filtered off and the filtrate evaporated to dryness.

Rf in Am:Py:Wa (5:3:2)=0.35 on $SiO_2$.

(3) H-Phe-Lys(Boc)-Phe-$NH_2$:

Of the ester obtained in (1) 500 mg. are dissolved in methanol, after which the solution is saturated with ammonia. The mixture is stirred for 24 hours. The amide crystallizes from the solution.

In the way described in (2) the protecting Z-group is removed from this amide.

Rf in Am:Py:Wa (5:3:2)=0.23 on $SiO_2$.

(4) H-Phe-Lys(Boc)-Phe-OH:

Of the peptide-ester obtained in (2) 0.5 g. is dissolved in 6 ml. of methanol, after which 1 equiv. NaOH is added. The mixture is stirred for one hour, after which it is gently acidified to precipitate the tripeptide acid.

Rf in Am:Py:Wa (5:3:2)=0.18 on $SiO_2$.

(P) H-Phe-D-Lys(Boc)-Phe-OtBu (1) Z-D-Lys(Boc)-Phe-OtBu:

Z-D-Lys(Boc)-ONP (10.03 g.) is dissolved in 50 ml. of DMF. This solution is cooled down to −20° C. and added to a solution of 4.1 g. of H-Phe-OtBu in 75 ml. of DMF.

The reaction mixture is stirred for 1 hour at 0° C. and for 20 hours at 20° C., after which it is evaporated to dryness. The yellow residue is dissolved in ethyl acetate/water and washed with 5% potassium carbonate, water, 5% citric acid and water. The organic phase is dried and evaporated to dryness. The residue is dissolved in ethyl acetate, after which enough petroleum ether 40/60 is added to cause a turbidity. Then the resulting precipitate is filtered off.

Rf in Bz:EtOH (9:1)=0.64 on $SiO_2$.

(2) H-D-Lys(Boc)-Phe-OtBu:

Of the dipeptide 3 g. are dissolved in 60 ml. of methanol. Then palladium 10% on charcoal is added, after which hydrogen is bubbled through the mixture till no more $CO_2$ escapes (2 hours). After filtration over hyflo, the filtrate is evaporated to dryness to obtain a foam.

Rf in To:EtOH (9:1)=0.21 on $SiO_2$.

(3) Z-Phe-D-Lys(Boc)-Phe-OtBu:

Z-Phe-ONP (2.18 g.) is dissolved in 15 ml. of DMF. Then a solution of 2.24 g. of H-D-Lys(Boc)-Phe-OtBu from (2) in 30 ml. of DMF is added, after which the mixture is stirred for 15 hours at 20° C. After evaporation of the yellow solution, the residue is dissolved in 15 ml. of ethyl acetate, after which 50 ml. of petroleum ether are added. Then the mixture is left to stand at 0° C. for 8 hours, after which the precipitate formed is filtered off. Melting point 135–138° C.

Rf in To:EtOH (9:1)=0.60 on $SiO_2$.

(4) H-Phe-D-Lys(Boc)-Phe-OtBu:

Of the tripeptide obtained in (3) 2.5 g. are hydrogenated in the same way as described in (2).

Rf in To:EtOH (8:2)=0.43 on $SiO_2$.

(Q) H-Phe-Lys(Boc)-phenylalkylamide (1) Z-Lys(Boc)-PPA:

Z-Lys(Boc)-ONP (10.33 g.; 20.6 mmol) is dissolved in 80 ml. of methylene chloride at about 0° C. Then 2.7 g. of 3-phenylpropylamine are added to this solution, after which the mixture is stirred at 0° C. for 1.5 hours and then at room temperature for 18 hours. The solvent is evaporated and the residue dissolved in 200 ml. of ethyl acetate. Then the ethyl acetate solution is washed successively with a 10% sodium carbonate solution, a 30% NaCl solution, 0.1 N HCl and a 30% NaCl solution. The ethyl acetate layer is dried and evaporated to a volume of about 80 ml. After that enough ether is added to cause a turbidity, after which the mixture is set aside in a refrigerator. After 2 hours the precipitate formed is filtered off. Melting point 78–79° C.

Rf in Bz:EtOH (9:1)=0.53 on $SiO_2$.

(2) H-Lys(Boc)-PPA:

Of the compound obtained in (1) 8.75 g. are dissolved in 120 ml. of methanol to which 1.2 g. of 10% palladium on charcoal has been added. While stirring, hydrogen in bubbled through the mixture for 3.5 hours, after which the catalyst is filtered off. The filtrate is evaporated to dryness to obtain a practically colourless oil, which is directly used for further reactions.

Rf in Am:Fo:Wa (7:2:1)=0.58 on SiO$_2$.

(3) Z-Phe-Lys(Boc)-PPA:

Of the protected amino acid derivative obtained in (2) 6.39 g. are dissolved in 68 ml. of dimethyl formamide, after which a solution of 7.61 g. of the Z-Phe-ONP in 20 ml. of dimethyl formamide is added. The mixture is stirred at room temperature for 20 hours and then the solvent is evaporated off in vacuum. The residue is dissolved in 170 ml. of ethyl acetate and washed successively with a 5% potassium carbonate solution, a 30% NaCl solution, 0.1 N HCl and a 30% NaCl solution. The ethyl acetate layer is then dried on Na$_2$SO$_4$ and evaporated to about 100 ml. The solution is set aside in a refrigerator for 3 days, during which period the peptide completely crystallizes. Melting point 134–136° C.

Rf in Bz:EtOH (8:2)=0.72 on SiO$_2$.

(4) H-Phe-Lys(Boc)-PPA:

Of the peptide derivative obtained in (3) 9.07 g. are dissolved in 300 ml. of dimethyl formamide to which 4 ml. of 4 N HCl and 1.5 g. of 10% palladium/charcoal has been added. While stirring, hydrogen is bubbled through the mixture for 3.5 hours, after which the catalyst is filtered off and the filtrate evaporated to dryness to obtain a practically colourless oil.

Rf in Bu:Ac:Wa (4:1:1)=0.63 on SiO$_2$.

(5) In the same way are prepared:

(1) H-Phe-Lys(Boc)-L-Amf
Rf in Bu:Ac:Wa (4:1:1)=0.63 and SiO$_2$.
(2) H-Phe-Lys(Boc)-PEA
Rf in Bu:Ac:Wa (4:1:1)=0.65 on SiO$_2$.
(3) H-Phe-D-Lys(Boc)-HPEA
Rf in To:EtOH (8:2)=0.29 on SiO$_2$.

(R) H-Phe-Lys(Boc)-Phe-Gly derivatives (1) Z-Phe-Lys(Boc)-N$_2$H$_3$:

Z-Phe-Lys(Boc)-OMe (12.0 g.) is dissolved in 30 ml. of methanol and 6 ml. of hydrazine hydrate. The mixture is left to stand for 24 hours and then stirred at 0° C. for 2 hours. The resulting precipitate is filtered off, washed with cold methanol and dried.

Rf in Bz:EtOH (8:2)=0.12 on SiO$_2$.

(2) Z-Phe-Lys(Boc)-Phe-Gly-OBzl:

Of the above hydrazide 5.42 g. are dissolved in 20 ml. of DMF. The solution is cooled down to 0°, after which 2 equiv. hydrochloric acid/THF are added and the mixture is cooled down to −20° C. Then 1.35 ml. of isoamylnitrite are added, after which the mixture is stirred at −20° C. for 7 minutes. This mixture is added to a solution of 3.5 g. of H-Phe-Gly-OBzl.HCl and 4.2 ml. of triethylamine (pH 7). The mixture is left to stand at 0° C. for 70 hours, after which the solvent is distilled off and the residue taken up in ethyl acetate/water, after which the organic phase is washed with 0.1 N HCl, sodium bicarbonate (5%) and water. The ethyl acetate layer is dried over sodium sulphate, after which the ethyl acetate is distilled off in vacuum.

Rf in Bz:EtOH (8:2)=0.71 on SiO$_2$.

(3) H-Phe-Lys(Boc)-Phe-Gly-OH:

One gram of the peptide obtained in (2) is dissolved in methanol:water 1:1 (20 ml.). Then 10% palladium on charcoal is added, after which hydrogen is bubbled through the mixture for 5 hours. After filtration over Hyflo, the filtrate is evaporated and stirred into dry ether.

Rf in Bu:Ac:Wa (4:1:1)=0.43 on SiO$_2$.

(S) Synthesis H-Phe-D-Lys(Boc)-Phe-Gly-OtBu (1) Z-D-Lys(Boc)-Phe-Gly-OtBu:

Z-D-Lys(Boc)-ONP (10.03 g.) is coupled to a solution of 5.1 g. of H-Phe-Gly-OtBu in 20 ml. of DMF and then evaporated. The resulting residue is dissolved (in ethyl acetate) again in the way described, washed and evaporated to dryness. The residue is directly processed further.

Rf in To:EtOH (9:1)=0.63 on SiO$_2$.

(2) H-D-Lys(Boc)-Phe-Gly-OtBu:

Hydrogenation gives the tripeptide in practically quantitative yield as a foam.

Rf in To:EtOH (9:1)=0.24 on SiO$_2$.

(3) Z-Phe-D-Lys(Boc)-Phe-Gly-OtBu:

Reaction of 2.18 g. of Z-Phe-ONP with 2.6 g. of H-D-Lys(Boc)-Phe-Gly-OtBu in 30 ml of DMF, for 24 hours, gives the tetrapeptide in 75% yield after crystallization from ethyl acetate-petroleum ether. Before the crystallization the ethyl acetate layer was washed with citric acid and a 5% sodium bicarbonate solution.

Melting point: 78–80° C. Rf in To:EtOH (8:2)=0.85 on SiO$_2$.

(4) H-Phe-D-Lys(Boc)-Phe-Gly-OtBu:

Hydrogenation of the tetrapeptide described in (3) gives H-Phe-D-Lys(Boc)-Phe-Gly-OtBu as a foam.

Rf in Bu:Py:Ac:Wa (4:¾:¼:1)=0.57 on SiO$_2$.

EXAMPLE I

H-Met-D-Glu-His-OH (1) Boc-Met-D-Glu(OtBu)-His-OH:

Boc-Met-D-Glu(OtBu)-His-OMe (2.34 g.; A.3) is dissolved in 50 ml. of 50% dioxane. To this solution 25 ml. of 2 N sodium hydroxide are added, after which the mixture is stirred at 20° C. for 30 minutes. The reaction mixture is neutralized to pH 7, after which it is evaporated to dryness in vacuum and the residue taken up in ethyl acetate/water. After that the pH of the water layer is adjusted to 4 with 2 N hydrochloric acid. The water layer is evaporated to dryness and the residue stirred into 25 ml. of abs. methanol, after which the precipitate is filtered off. The filtrate is evaporated to dryness.

(2) H-Met-D-Glu-His-OH:

One gram of tripeptide from (1) is dissolved in 10 ml. of 90% trifluoro acetic acid and the mixture is stirred for 30 minutes. The reaction mixture is added dropwise to peroxide-free ether, after which the precipitate is filtered off and triturated with ether. The residue is dried over solid potassium hydroxide. After being dissolved in 25 ml. of t.butanol-water (1:1), Dowex X-8, in the acetate form is added to exchange the trifluoro acetic acid for acetic acid (final pH 5–5.4). The ion exchanger is filtered off and the filtrate lyophilized.

Rf in Bu:Py:Ac:Wa (4¾:¼:1)=0.13 on SiO$_2$.

EXAMPLE II

H-A-D-Glu-His-(N-phenylalkyl)amides (A=Met, Desamino-Met, β-Ala or Val)

(1) Boc-Met-D-Glu(OtBu)-His-PEA:

Of the tripeptide Boc-Met-D-Glu(OtBu)-His-N$_2$H$_3$ from A.4 2.87 g. are dissolved in 20 ml. of DMF. The solution is cooled down to 0° C., after which 5.94 ml. of 1.56 N HCl in THF and at −20° C. 0.42 ml. of isoamylnitrite are added, after which the azide is formed. This azide is added to 3.2 mmol phenylethylamine, after which the final pH is adjusted to 7.2 with TAA.

After 70 hours' stirring at 0°, the reaction mixture is evaporated in vacuum and the residue taken up in ethyl acetate. The organic phase is washed with water, a 5% sodium bicarbonate solution and water, and then dried and distilled off in vacuum.

Yield: 1.9 g. of oil, Rf in Bz:EtOH (8:2)=0.51 on SiO$_2$.

(2) In the same way are prepared:

Boc-Met-D-Glu(OtBu)-His-Amf: Rf in Bz:EtOH (8:2)=0.49 on SiO$_2$
Boc-Met-D-Glu(OtBu)-His-PPA: Rf in Bz:EtOH (8:2)=0.51 on SiO$_2$.

(3) H-Met-D-Glu-His-(N-phenylalkyl)amide:

In the way described in Example I.2 one gram of peptide from II:1 or II.2 is treated with TFA and the trifluoro-acetate obtained converted into the acetate.

Yield 70–75%.

The acetates are obtained of:

H-Met-D-Glu-His-PEA: $Rf^*=0.39$
H-Met-D-Glu-His-Amf: $Rf^*=0.36$
H-Met-D-Glu-His-PPA: $Rf^*=0.38$

*$Rf$ in Bu : Py : Ac : Wa (4 : 3/4 : 1/4 : 1) on SiO$_2$.

(4) In the way described in Example II.1 some hydrazides prepared in B are converted into the azide and coupled to phenylethylamine, after which the protecting groups are removed with trifluoro acetic acid (Example II.3). Then the trifluoro acetic acid is exchanged for acetic acid.

Obtained the acetates of:

H-β-Ala-D-Glu-His-PEA: $Rf^*=0.34$
H-Val-D-Glu-His-PEA: $Rf^*=0.37$
Desamino-Met-D-Glu-His-PEA: $Rf^*=0.44$

*$Rf$ in Bu : Py : Ac : Wa (4 : 3/4 : 1/4 : 1) on SiO$_2$.

EXAMPLE III

H-A-Glu-D-His-Phe-OH, H-Met-Glu-D-His-PPA and derivatives thereof (1) Boc-Met-Glu(OtBu)-D-His-Phe-OtBu:

Boc-Met-Glu(OtBu)-D-His-N$_2$H$_3$ (1.87 g.; C.5) is converted into the azide as described in Example II.1.

The azide is added to a solution of 0.52 g. of H-Phe-OtBu in 10 ml. of DMF cooled down to 0° (final pH 7.2 by means of TAA) and the reaction mixture is stirred at 0° for 71 hours. After evaporation of the reaction mixture the residue is dissolved in aqueous ethyl acetate, after which the ethyl acetate is washed twice with saliferous water and then dried. The organic phase is evaporated and the residue dried.

Yield: 1.9 g. $Rf$ in Bz:EtOH (8:2)=0.90 on SiO$_2$.

(2) H-Met-Glu-D-His-Phe-OH:

Of the tetrapeptide (III.1) 0.5 g. is treated in 20 ml. of 90% trifluoro acetic acid, as described in Example I.2.

NOTE.—$Rf$ in Bu : Py : Ac : Wa (4 : 3/4 : 1/4 : 1) = 0.26 on SiO$_2$.

(3) In the way described in 1 and 2 the following acetates are prepared starting from Boc-Met-Glu(OtBu)-D-His-N$_2$H$_3$ and H-Phe-OC$_{11}$H$_{23}$, H-Phe-OMe or phenylpropylamine:

H-Met-Glu-D-His-Phe-OC$_{11}$H$_{23}$
H-Met-Glu-D-His-Phe-OMe
H-Met-Glu-D-His-PPA (4) Starting from the hydrazides prepared in D are prepared in the way described in III.1 and III.2 the acetates of:

H-Gly-Glu-D-His-Phe-Oh: $Rf^*=0.21$
H-Ala-Glu-D-His-Phe-OH: $Rf^*=0.22$
H-β-Ala-Glu-D-His-Phe-OH: $Rf^*=0.20$
H-(α-Me)Ala-Glu-D-His-Phe-OH: $Rf^*=0.24$
Desamino-Met-Glu-D-His-Phe-OH: $Rf^*=0.32$
H-Met-Gln-D-His-Phe-OH: $Rf^*=0.30$

*$Rf$ in Bu : Py : Ac : Wa (4 : 3/4 : 1/4 : 1) on SiO$_2$.

EXAMPLE IV

H-A-Glu-D-His-Phe-L(or D)-Lys-OH (A=Met, β-Ala or Desamino-Met)

(1) Boc-Met-Glu(OtBBuB)-D-His-Phe-Lys(Boc)-OtBu:

Boc-Met-Glu(OtBu)-D-His-N$_2$H$_3$ (C.5), 1.87 g., are converted into the azide in the manner described in Example II.1.

The azide solution is added to 3.2 mmol H-Phe-Lys(Boc)-OtBu (F) in 10 ml. of DMF, after which the pH of the reaction mixture is adjusted to 7.2 with TAA. After having been left to stand for 70 hours at 0° C., the reaction mixture is evaporated to dryness in vacuum and the residue taken up in aqueous ethyl acetate. The ethyl acetate is washed 3 times with water, dried and distilled off in vacuum, after which an oil remains.

$Rf$ in Bz:EtOH (9:1)=0.30 on SiO$_2$.

(2) Boc-Met-Glu,OtBu)-D-His-Phe-D-Lys(Boc)-OH:

If the azide prepared in Example IV.1 is added to 3.2 mmol H-Phe-D-Lys(Boc)-OH (G.2) and 0.45 ml. of TAA in 10 ml. of DMF 1.7 g. of oil is obtained after the mixture has been processed as described above and extracted with saliferous water.

$Rf$ in Bz:EtOH (8:2)=0.21 on SiO$_2$.

(3) Removal protecting groups:

Of the peptides IV.1 or IV.2 0.5 g. is treated in the way described before. The product is exchanged for acetate after which the following peptides are obtained as an acetate.

H-Met-Glu-D-His-Phe-Lys-OH: $Rf^*=0.20$ on SiO$_2$
H-Met-Glu-D-His-Phe-D-Lys-OH: $Rf^*=0.18$ on SiO$_2$ (4) In the same way are prepared:

H-β-Ala-Glu-D-His-Phe-Lys-OH by starting from the hydrazide prepared in D.1.b; $Rf$ in Bu:Py:Ac:Wa (4:3/4:1/4:1)=0.16 on SiO$_2$, and Desamino-Met-Glu-D-His-Phe-Lys-OH by starting from the hydrazide prepared in D.1.c.

$Rf$=0.28 on SiO$_2$.

EXAMPLE V

H1Met-D-Glu-His-Phe-(N-aminopentyl)amide (1) Boc-Met-D-Glu(OtBu) - His - Phe-N-(CH$_2$)$_5$-NH-Boc:

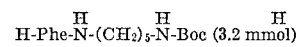

H-Phe-N-(CH$_2$)$_5$-N-Boc (3.2 mmol)

prepared in H, is coupled to Boc-Met-D-Glu(OtBu)-His-N$_3$, prepared in Example II.1. After 70 hours' stirring the condensation product is processed in the way described in Example II.1 and the ethyl acetate layer is added dropwise to petroleum ether to obtain a precipitate.

$Rf$ in Bu:Ac:Wa (4:1:5)=0.63 on SiO$_2$.

(2) Removal protecting groups:

In a conventional manner the tetrapeptide amide is treated with TFA and the trifluoro acetate obtained converted to the acetate.

Rf in Bu:Py:Ac:Wa (4:3/4:1/4:1)=0.25 on SiO$_2$.

EXAMPLE VI

H-Met-D-Glu-His-Phe-D-Arg-OH and methylester (1) Boc-Met-D-Glu(OtBu)-His-Phe-D-Arg-OH:

Coupling of Boc-Met-D-Glu(OtBu)-His-N$_3$, prepared in Example II.1, and H-Phe-D-Argo-OH.acetate (E.3) in the way described in Example II.1 gives the above pentapeptide as a amorphous substance in 62% yield.

$Rf$ in Bz:EtOH (8:2)=0.16 on SiO$_2$ and in

Bu:Py:Ac:Wa (2:3/4:1/4:1)=0.53.

(2) In the same way the azides Boc-Met-D-Glu-(OtBu)-His-N$_3$ and Desamino-Met-Glu(OtBu)-His-N$_3$ are condensed with H-Phe-D-Arg-OMe (E.4).

(3) Removal protecting groups:

0.5 g. of peptide from 1 (or 2) is dissolved in 15 ml. of trifluoro acetic acid/water (9:1) and after that the mixture is stirred for 30 minutes. The resulting TFA salt is converted into the acetate and stored over solid potassium hydroxide (see Example I.1).

Obtained the acetate of:

H-Met-D-Glu-His-Phe-D-Arg-OH: $Rf^*=0.17$
H-Met-D-Glu-His-Phe-D-Arg-OMe: $Rf^*=0.29$
Desamino:Met-D-Glu-His-Phe-D-Arg-Ome: $Rf^*=0.34$

*$Rf$ in Bu : Py : Ac : Wa (4 : 3/4 : 1/4 : 1) on SiO$_2$.

EXAMPLE VII

H1Met-D-Glu-His-Phe-Lys-Trp-OH and derivatives thereof (1) Boc-Met-D-Glu(OtBu)-His - Phe - Lys(Boc) - Trp-OH:

Of the tripeptide hydrazide: Boc-Met-D-Glu(OtBu)-His-N₂H₃ (A.4) 1.87 g. are dissolved in 20 ml. of DMF. The solution is cooled down to 0° and after that 5.94 ml. of 1.566 N HCl/THF are added and at —20° C. 0.42 ml. of isoamylnitrite, by which the azide is formed. This azide is added to a solution of 1.45 g. of H-Phe-Lys(Boc)-Trp-OH.HCl (K.2) in 15 ml. of DMF, after which the pH is adjusted to 7.2 with TAA.

After 70 hours' stirring at 0° C., the reaction mixture is evaporated and the residue taken up in aqueous ethyl acetate and washed with saliferous water. The organic layer is dried and evaporated. Then petroleum ether is added to obtain a solid substance.

Yield: 1.66 g.

R$f$ in Bu:Py:Ac:Wa (4:3/4:1/4:1)=0.85 on SiO₂.

(2) H-Met-D-Glu-His-Phe-Lys-Trp-OH:

Of the above peptide 1.6 g. are dissolved in 25 ml. of 90% trifluoro acetic acid. The light red solution is left to stand for 30 minutes, after which it is poured into 400 ml. of dry, peroxide free ether. The solid substance is filtered off and dried. The salt obtained is dissolved in 70 ml. of t-BuOH:water=1:1. After that the mixture is stirred with Dowex X-8 in the acetate form to obtain a final pH of 5–5.5. The mixture is stirred for 1 hour. After filtration the filtrate is lyophilized to obtain the acetate of H-Met-D-Glu-His-Phe-Lys-Trp-OH.

R$f$ in Bu:Py:Ac:Wa (2:3/4:1/4:1)=0.17 on SiO₂.

(3) In the same way as described in (1) and (2) the azide described in (1) is coupled to H-Phe-Lys(Boc)-Trp-NH₂ or H-Phe-Lys(Boc)-Trp-OC₁₁H₂₃, prepared in K.5, and then the protecting groups are removed.

Obtained the acetates of:

H-Met-D-Glu-His-Phe-Lys-Trp-NH₂ and
H-Met-D-Glu-His-Phe-Lys-Trp-OC₁₁H₂₃.

EXAMPLE VIII

H-A-Glu-D-His-Phe-Lys-Trp-OH (1) Z-Glu(OtBu)-D-His-Phe-Lys(Boc)-Trp-OH:

Z-Glu(OtBu)-D-His-N₂H₃ (4.1 g.; C.2) is dissolved in 60 ml. of DMF. The solution is cooled down to 0° C., after which 5.5 ml. of 1 N THF/HCl is added and at —20° C. 1.35 ml. of isoamylnitrite. The azide formed during 10 minutes' stirring at —20° C. is added to a solution of 8.4 mmol H-Phe-Lys(Boc)-Trp-OH.HCl (K.2) in 20 ml. of DMF, after which the pH of the reaction mixture is adjusted to 7.2. The mixture is stirred for 100 hours at 0° C., after which it is filtered off and the filtrate evaporated to dryness in vacuum. The residue, dissolved in ethyl acetate, is washed successively with water, a 10% citric acid solution, water and saliferous water and then dried. The ethyl acetate is distilled off and after that the residue is taken up in DMF (25 ml.) and added dropwise to 600 ml. of ethyl acetate/ether (1:2). Yield 5.3 g.

R$f$ in Bu:Py:Ac:Wa (4:3%4:1/4:1)=0.73 on SiO₂.

(2) H - Glu(OtBu) - D - His - Phe - Lys(Boc) - Trp-OH.HCl:

Five grams of the above peptide 1. are dissolved in 100 ml. of DMF and 2.2 ml. of 4 N HCl. After the addition of 1 g. of palladium 10% on charcoal hydrogen is bubbled through the mixture. After 24 hours the mixture is filtered and the filtrate evaporated in vacuum. The residue is recrystallized from methanol-ether. Yield: 4.5 g.

R$f$ in Am:Fo:Wa (7:2:1)=0.68 on SiO₂.

(3) Boc-Met-Glu(OtBu)-D-His-Phe- - Lys(Boc) - Trp-OH:

Boc-Met-N₂H₃ (0.982 g.; 3.73 mmol) is dissolved in 20 ml. of DMF. The solution is cooled to 0°, after which 3.8 ml. of 2 N HCl/THF are added and at —20° C. 0.5 ml. of isoamylnitrite, after which the mixture is stirred at —20° C. for 10 minutes.

The azide is added to 3.2 g. of H-Glu(OtBu)-D-His-Phe-Lys(Boc)-Trp-OH.HCl (Example VIII.2) after which the pH is adjusted to 7.1 with TAA.

The mixture is stirred at 0° C. for 71.5 hours, after which the filtrate is evaporated to dryness and the residue stirred into 100 ml. of ethyl acetate. Yield: 3.05 g.

R$f$ in Bu:Py:Ac:Wa (4:3/4:1/4:1)=0.83 on SiO₂.

(4) By coupling the required Boc-amino acid-azide to H-Glu(OtBu)-D-His-Phe-Lys(Boc)-Trp-OH.HCl in the same manner as described in 3, the following peptides are prepared:

Boc-β-Ala-Glu(OtBu)-D-His-Phe-Lys(Boc)-Trp-OH
Boc-Val-Glu(OtBu)-D-His-Phe-Lys(Boc)-Trp-OH
Boc-(α-Me)-Ala-Glu(OtBu)-D-His-Phe-Lys(Boc)-Trp-OH
Boc-Gly-Glu(OtBu)-D-His-Phe-Lys(Boc)-Trp-OH
Desamino-Met-Glu(OtBu)-D-His-Phe-Lys(Boc)-Trp-OH (5) H-A-Glu-D-His-Phe-Lys-Trp-OH:

Two grams of a peptide described in Example VIII.3 or VIII.4 are dissolved in 45 ml. of 90% trifluoro acetic acid and treated as described before.

By exchanging the trifluoro-acetate for acetate with Dowex X-8 the hexapeptide is obtained as an acetate in 85–92% yield.

H-Met-Glu-D-His-Phe-Lys-Trp-OH: R$f$* 0.32
H-β-Ala-Glu-D-His-Phe-Lys-Trp-OH: R$f$* 0.25
H-Val-Glu-D-His-Phe-Lys-Trp-OH: R$f$* 0.31
H-(α-Me)Ala-Glu-D-His-Phe-Lys-Trp-OH: R$f$* 0.30
H-Gly-Glu-D-His-Phe-Lys-Trp-OH: R$f$* 0.27
Desamino-Met-Glu-D-His-Phe-Lys-Trp-OH: R$f$* 0.37

*R$f$ in Bu : Py : Ac : Wa (2 : 33/4 : 1/4 : 1) on SiO₂.

EXAMPLE IX

H-Met-Glu-D-His-Phe-Lys-Trp-OH and derivatives (1) Boc-Met-Glu(OtBu)-D-His-Phe-Lys(Boc)-Trp-Y:

Boc-Met-Glu(OtBu)-D-His-N₂H₃ (9.35 g.) is converted in a conventional manner into the azide (Example III.1), after which the solvent is added to bring the volume of the solution at exactly 50 ml.

Of this solution ⅕ part is added to: 3.2 mmol H-Phe-Lys(Boc)-Trp-OH.HCl (K.2) in 10 ml. of DMF at 0° C.;

⅕ part of the solution is added to: 3.2 mmol H-Phe-Lys(Boc)-Trp-NH₂.HCl (K.5) in 10 ml. of DMF at 0° C., ⅕ part to: 3.2 mmol of H-Phe-Lys(Boc)-Trp- OC₁₁H₂₃.HCl (K.5) in 10 ml. of DMF at 0° C., and ⅕ part to: 3.2 mmol of H-Phe-Lys(Boc)-Trp-N(CH₃)₂.HCl in 10 ml. of DMF at 0° C., after which the pH of each of the mixtures is adjusted to 7.2–7.3 with TAA. The mixtures are stirred at 70 hours at 0° C. after which each reaction mixture is evaporated in vacuum (bath 40° C.) and the residue taken up in aqueous ethyl acetate. This layer is washed 3 times in water, after which the ethyl acetate is evaporated off in vacuum, the residue taken up in alcohol and the solution diluted with peroxide-free ether to obtain a precipitate.

Yield:

71% hexapetitde acid; R$f$ in Bz:EtOH (8:2)=0.25 on SiO₂
57% hexapeptide amide; R$f$ in Bz:EtOH (8:2)=0.38 on SiO₂
61% hexapeptide ester; R$f$ in Bz:EtOH (8:2)=0.49 on SiO₂
50% hexapeptide dimethylamide; R$f$ in Bz:EtOH (8:2)=0.45 on SiO₂.

(2) Removal protecting groups:

Of the hexapeptide prepared above 0.5 g. is dissolved in 25 ml. of 90% trifluoro acetic acid and stirred at 20° C. for 1 hour. The mixture is poured into 300 ml. of dry peroxide-free ether, after which the precipitate is filtered and dried over solid KOH. 250 mg. of substance are dissolved in 30 ml. of t-butanol:water (1:1) and stirred with Dowex X-8 in the acetate form to obtain a final pH of 5.2.

After filtration 20 ml. of t-butanol-water are added and the entire filtrate is evaporated to dryness.

Obtained in this way the acetates of:

H-Met-Glu-D-His-Phe-Lys-Trp-OH: $Rf^*=0.32$ on $SiO_2$
H-Met-Glu-D-His-Phe-Lys-Trp-$NH_2$: $Rf^*=0.37$ on $SiO_2$
H-Met-Glu-D-His-Phe-Lys-Trp-$OC_{11}H_{23}$: $Rf^*=0.47$ on $SiO_2$
H-Met-Glu-D-His-Phe-Lys-Trp-$N(CH_3)_2$: $Rf^*=0.42$ on $SiO_2$

*$Rf$ in Bu:Py Ac:Wa (2:3/:1/4: 1).

EXAMPLE X

H-Met-Glu-D-His-Phe-Arg-Trp-OH

Starting from Boc-Met-Glu(OtBu)-D-His-$N_3$, prepared in accordance with Example III.1, and H-Phe-Arg-Trp-OH from L.4 the hexapeptide is obtained after 70 hours' stirring at 0° C.

The residue obtained after evaporation of the reaction mixture in vacuum is taken up in DMF and poured into the tenfold quantity of water. The resulting precipitate is dried and treated in the manner described before.

$Rf$ in Bu:Py:Ac:Wa (4:3/4:1/4:1)=0.17 on $SiO_2$.

The amorphous product, which has a light colour, is purified further via a counter current distribution; system: Bu:Ac:Wa (4:1:5).

EXAMPLE XI

M-Met-D-Glu-His-Phe-Arg-Tra, H-Met-D-Glu-His-Phe-Lys-Phe-OH (1) Starting from 1.87 g. of Boc-Met-D-Glu(OtBu)-His-$N_2H_3$ and 3.2 mmol H-Phe-Arg-Tra (M.2) the pentapeptide amide is prepared by the process described in Example II.1. The reaction mixture is left to stand for 84 hours at 0° C., evaporated to dryness and taken up in aqueous ethyl acetate.

The mixture is extracted 3 times with water, after which the ethyl acetate is dried and distilled off in vacuum. The residue is taken up in DMF and added dropwise to ethyl acetate/petroleum ether (1:1) to obtain a precipitate. Yield: 1.72 g. $Rf$ in Bu:Py:Ac:Wa (4:3/4:1/4:1)=0.51 on $SiO_2$.

Treatment as described before with trifluoro acetic acid and exchanging this product against acetic acid gives the acetate of H-Met-D-Glu-His-Phe-Arg-Tra in 82% yield.

$Rf$ in Bu:Py:Ac:Wa (4:3/4:1/4:1)=0.17 on $SiO_2$.

(2) In the same manner as described in (1) the peptide H-Met-D-Glu-His-Phe-Lys-Phe-Oh.acetate is prepared, starting from Boc-Met-D-Glu(OtBu)-His-$N_2H_3$ and H-Phe-Lys(Boc)-Phe-OH (0.4).

$Rf$ in Bu:Py:Ac:Wa (4:3/4:1/4:1)=0.19 on $SiO_2$.

EXAMPLE XII

H-A-Glu-D-His-Phe-Lys-Tra (1) Boc-Met-Glu(OtBu)-D-His-Phe-Lys(Boc)-Tra:

Boc-Met-Glu(OtBu)-D-His-$N_2H_3$ (1.87 g.) is dissolved in 20 ml. of DMF, converted into the azide in accordance with Example III.1 and coupled to the H-Phe-Lys-(Boc)-Tra prepared in N.2. The pH is adjusted to 7.2 with TAA, after which the reaction mixture is stirred at 0° C. for 70 hours and then filtered. The DMF is distilled off in vacuum and the residue is taken up in ethyl acetate, washed with water, a 5% sodium bicarbonate solution and water, after which the ethyl acetate layer is dried. This oragnic phase is distilled off, after which the residue is taken up in alcohol and added dropwise to peroxide-free ether. The precipitate formed is filtered off.

Melting point: 203° dec.

(2) Removal protecting groups:

0.5 g. of peptide from (1) is dissolved in 25 ml. of 90% trifluoro acetic acid and the mixture is stirred for 30 minutes. In the manner described before, the trifluoro acetate is isolated, dried and exchanged for the acetate, after which the acetate of H-Met-Glu-D-His-Phe-Lys-Tra is obtained by lyophilizing the filtrate.

$Rf$ in Bu:Py:Ac:Wa (4:3/4:1/4:1)=0.22 on $SiO_2$.

(3) In the same manner are prepared the acetates of:

H-$\beta$-Ala-Glu-D-His-Phe-Lys-Tra
H-Val-Glu-D-His-Phe-Lys-Tra
H-Ala-Glu-D-His-Phe-Lys-Tra
Desamino-Met-Glu-D-His-Phe-Lys-Tra.

EXAMPLE XIII

H-Met-Glu-His-Phe-Lys-Phe-OH and derivatives (1) Boc - Met - Glu(OtBu)-D-His-Phe-Lys(Boc)-Phe-OH:

Starting from the Boc-Met-Glu(OtBu)-D-His-$N_3$ prepared in Example IX.1 (9.35 g. of hydrazide converted into azide and diluted to 50 ml. of a DMF solution), ⅕ part is coupled to 3.2 mmol H-Phe-Lys(Boc)-Phe-OH (prepared in 0.4). The reaction mixture is adjusted to pH 7.3 with TAA and stirred at 0° C. for 70 hours. After acidifying to pH 4, the DMF suspension is poured into the eightfold quantity of water.

The resulting precipitate is stirred at 0° C. for another 3 hours and filtered off.

Yield: 1.63 g. of peptide; melting point 188° dec.

(2) Boc - Met - Glu(OtBu)-D-His-Phe-Lys(Boc)-Phe-$NH_2$:

The azide ⅕ part of the solution mentioned in (1) is coupled to 3.2 mmol H-Phe-Lys(Boc)-Phe-$NH_2$ (0.3) and processed in the same way as in 1, but without being acidified.

Melting point 204° dec. Brown colouring.

(3) Boc - Met - Glu(OtBu)-D-His-Phe-Lys(Boc)-Phe-OMe:

⅕ part of the azide solution prepared in (1) is coupled to 3.2 mmol H-Phe-Lys(Boc)-Phe-OMe (0.2) and processed in the same way as described in 1, without being acidified.

$Rf$ in Bu:Py:Ac:Wa (4:3/4:1/4:1)=0.61 on $SiO_2$.

(4) Boc-Met-Glu(OtBu)-D-His-Phe-D-Lys(Boc)-Phe-OtBu:

⅕ part of the azide solution prepared in (1) is added to a solution of 3.2 mmol H-Phe-D-Lys(Boc)-Phe-OtBu in 10 ml. of DMF (P.4). The pH is adjusted to 7.3 with TAA, after which the reaction mixture is stirred at 0° C. for 70 hours and then evaporated in vacuum. The residue is taken up in aqueous ethyl acetate and washed 3 times with water, after which the ethyl acetate layer is dried and evaporated. The residue is recrystallized from alcohol-ether/petroleum ether (1:1). Yield: 2.1 g.

$Rf$ in Bu:Py:Ac:Wa (4:3/4:1/4:1)=0.73 on $SiO_2$.

(5) Boc-Met-Glu(OtBu)-D-His-Phe-Lys(Boc)-PPA:

⅕ part of the solution prepared in (1) is added to the cooled solution of 3.3 mmol of H-Phe-Lys(Boc)-PPA (Q.4) in 10 ml. of DMF. The pH is adjusted to 7.2, after which the reaction mixture is stirred for 70 hours and then processed in a conventional manner. The PPA-peptide is recrystatllized from dry ethyl acetate.

$Rf$ in To:EtOH (8:2)=0.35 on $SiO_2$.

(6) Treatment of the peptides obtained in 1–5:

Of the peptides described above 0.5 g. is dissolved in 25 ml. of 90% TFA, stirred for 1 hour and then processed further in the usual manner. After that the exchange for acetate takes place in 50 ml. of t-BuOH:$H_2O$ (1:1).

Obtained in this way the acetates of:

H-Met-Glu-D-His-Phe-Lys-Phe-Oh: $Rf^*=0.18$
H-Met-Glu-D-His-Phe-Lys-Phe-OMe: $Rf^*=0.27$
H-Met-Glu-D-His-Phe-Lys-Phe-$NH_2$: $Rf^*=0.23$
H-Met-Glu-D-His-Phe-D-Lys-Phe-OH: $Rf^*=0.17$

H-Met-Glu-D-His-Phe-Lys-PPA: $Rf^*=0.30$

*$Rf$ in Bu:Py:Ac:Wa (4:3/4:1/4:1) on $SiO_2$.

EXAMPLE XIV

H-Met-Glu-D-His-Phe-Lys-Phe-Gly-OH

Boc-Met-Glu(OtBu)-D-His-$N_2H_3$ (3.74 g.) is converted into the azide (see Example IX.1) and coupled to 6.4 mmol H-Phe-Lys(Boc)-Phe-Gly-OH (R.3) in the manner described in Example XIII.1.

The reaction mixture obtained is poured into water and the resulting precipitate filtered off.

$Rf$ in Bu:Py:Ac:Wa (4:3/4:1/4:1)=0.50 on $SiO_2$.

Treatment as described in Example I.2 gives the heptapeptide acetate.

$Rf$ in Bu:Py:Ac:Wa (2:3/4:1/4:1)=0.25 on $SiO_2$.

EXAMPLE XV

H-A-Glu-D-His-Phe-Lys-Phe-OH

In the manner described in Example XIII.1 the hydrazides, prepared in D.1 are converted into the azide and coupled to the peptide derivative prepared in 0.4 or P.4. The peptides obtained are treated in the manner described in Example XIII.6.

The following peptides are obtained as acetic acid salts:

H-$\beta$-Ala-Glu-D-His-Phe-Lys-Phe-OH
H-Gly-Glu-D-His-Phe-Lys-Phe-OH
H-($\alpha$-Me)Ala-Glu-D-His-Phe-Lys-Phe-OH
H-Val-Glu-D-His-Phe-Lys-Phe-OH
H-Ala-Glu-D-His-Phe-Lys-Phe-OH
Desamino-Met-Glu-D-His-Phe-Lys-Phe-OH
Desamino-Met-Glu-D-His-Phe-D-Lys-Phe-OH.

EXAMPLE XVI

Sulfoxides of Met- and Desamino-Met peptides 0.06 mmol of the (Met-containing) peptide is dissolved in 5 ml. of acetic acid, after which 15 $\mu$l. of 30% hydrogene peroxide are added. The mixture is stirred at 20° C. for 1 hour, after which a suspension of 20 mg. of platinum (black) in 2.5 ml. of glacial acetic acid is added. Then the mixture is stirred for 30 minutes and filtered, and the solvent distilled off in vacuum. The resulting residue is taken up in 10 ml. of tert. butanol/water and lyophilized.

Obtained in this way:

Met($\rightarrow$O)-Glu-D-His-Phe-OH: $Rf^*=0.22$
Met($\rightarrow$O)-Glu-D-His-Phe-Lys-Phe-OH: $Rf^*=0.15$
Met($\rightarrow$O)-Glu-D-His-Phe-D-Lys-Phe-OH: $Rf^*=0.14$
Met($\rightarrow$O)-Glu-D-His-Phe-Lys-Tra: $Rf^*=0.15$
Met($\rightarrow$O)-D-Glu-His-Phe-Lys-Trp-OH: $Rf^*=0.17$
Desamino-Met($\rightarrow$O)-Glu-D-His-Phe-Lys-Phe-OH: $Rf^*=0.22$
Desamino-Met($\rightarrow$O)-Glu-D-His-Phe-Lys-Tra: $Rf^*=0.22$

*$Rf$ in Bu:Py:Ac:Wa (4:3/4:1/4:1).

EXAMPLE XVII

Sulfones of Met- and Desamino-Met peptides 0.2 mmol of the (Met-containing) peptide is dissolved in a mixture of 0.5 ml. of water, 0.1 ml. of 4 N perchloric acid, 0.02 ml. of 0.5 M ammoniummolybdate, after which 0.06 ml. of 30% hydrogen peroxide is added. The mixture is stirred for 2 hours at a temperature of about 10–15° C. and then diluted with 25 ml. of t-butanol/water. After that Dowex X–8 in the acetate form is added. The mixture is stirred for 30 minutes, after which is is filtered and the resulting filtrate is lyophilized.

Obtained in this way the acetates of:

Met($\rightarrow O_2$)-Glu-D-His-Phe-Lys-Tra: $Rf^*=0.20$
Met($\rightarrow O_2$)-Glu-D-His-Phe-Lys-Phe-OH: $Rf^*=0.16$
Met($\rightarrow O_2$)-Glu-D-His-Phe-D-Lys-Phe-OH: $Rf^{**}=0.25$
Met($\rightarrow O_2$)-Glu-D-His-Phe-Lys-Phe-Gly-OH: $Rf^{**}=0.22$
Desamino-Met($\rightarrow O_2$)-Glu-D-His-Phe-Lys-Phe-OH: $Rf^{**}=0.32$
Desamino-Met($\rightarrow O_2$)-Glu-D-His-Phe-Lys-Tra: $Rf^{**}=0.36$
H-Met($\rightarrow O_2$)-D-Glu-His-Phe-Lys-Trp-OH: $Rf^*=0.22$
H-Met($\rightarrow O_2$)-D-Glu-His-Phe-Arg-Tra: $Rf^*=0.16$

*$Rf$ in Bu:Py:Ac:Wa (4:3/4:1/4:1) on $SiO_2$.
**$Rf$ in Bu:Ac:Wa (4:1:1) on $SiO_2$.

EXAMPLE XVIII

Zinccomplexes

Of a solution of zinc chloride, containing 50 mg. of zinc per ml., 1.5 ml. are added to a solution of 31.5 mg. of $Na_2HPO_4.2H_2O$ in 30 ml. of distilled water. The precipitate of zinc phosphate formed is dissolved again by adding 4 N HCl. Then 175 mg. of NaCl and 0.5 g. of benzylalcohol are added to this mixture. Then 1.5 mg. of the hexapeptide H-L-Met-L-Glu-D-His-L-Phe-L-Lys-L-Phe-OH (Example XIII.6) are dissolved in this mixture and then enough 1 N sodium hydroxide to adjust the pH of the mixture to 8.5. After that the volume is completed to 50 ml. with distilled water.

One ml. of suspension contains:

30 $\mu$g. of hexapeptide
1.5 mg. of zinc
0.63 mg. of $Na_2HPO_4.2H_2O$
3.5 mg. of NaCl
10 mg. of benzylalcohol

What is claimed is:
1. A peptide of the formula:

A-Glu(Q)-His-X in which one of the amino radicals Glu(Q) or His is present in the D-form; in which A is selected from the group consisting of H-L-Met, H-L-Met($\rightarrow$O), H-L-Met($\rightarrow O_2$) desamino-Met, desamino-Met($\rightarrow$O), desamino-Met($\rightarrow O_2$), and the moiety: $H_2N$-B-CO- in which B is alkylene having 1–6 carbon atoms;

Q is selected from the group consisting of OH and $NH_2$;

X is selected from the group consisting of hydroxy; (N-phenylalkyl) amino of the formula

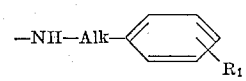

in which Alk is alkylene with 1–6 carbon atoms, and $R_1$ is selected from the group consisting of hydrogen and hydroxy; and -L-Phe-Y;

Y is selected from the group consisting of hydroxy, descarboxyl-lysyl, descarboxy-arginyl, -L-Lys-Z, -L-Arg-Z, -D-Lys-Z, and -D-Arg-Z;

Z is selected from the group consisting of hydroxy, (N-$\beta$-indolyl-ethyl) amino, -L-Trp-OH, -L-Trp-Gly-OH, -L-Phe-OH, -L-Phe-Gly-OH, and (N-phenylalkyl) amino of the formula

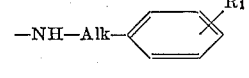

in which Alk is alkylene with 1–6 carbon atoms, $R_1$ is selected from the group consisting of hydrogen and hydroxy;

and functional derivatives of said peptide selected from the group consisting of pharmaceutically acceptable acid addition salts, derivatives in which one or more free amino groups are substituted by acyl derived from an aliphatic carboxylic acid with 1–6 carbon atoms, unsubstituted amides or lower alkyl (1–6 C) substituted amides of those peptides having a free carboxyl group, esters derived from aliphatic or phenylaliphatic alcohols with 1–18 carbon atoms, and metal complexes thereof.

2. A peptide of the formula:

A-L-Glu(Q)-D-His-X in which

A is selected from the group consisting of H-L-Met, H-L-Met(→O), H-L-Met(→O₂), desamino-Met, desamino-Met(→O), desamino-Met(→O₂), and the moiety: H₂N-B-CO- in which B is alkylene having 1–6 carbon atoms;

Q is selected from the Group consisting of OH and NH₂;

X is selected from the group consisting of hydroxy, (N-phenylalkyl) amino of the formula

in which Alk is alkylene with 1–6 carbon atoms, and R₁ is selected from the group consisting of hydrogen and hydroxy; and -L-Phe-Y;

Y is selected from the group consisting of hydroxy, descarboxyl-lysyl, descarboxy - arginyl, -L-Lys-Z, -L-Arg-Z, -D-Lys-Z, and -D-Arg-Z;

Z is selected from the group consisting of hydroxy, (N - β - indolyl - ethyl) amino, -L-Trp-OH, -L-Trp-Gly-OH, -L-Phe-OH, -Phe-Gly-OH, and (N-phenylalkyl) amino of the formula

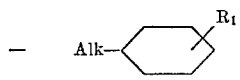

in which Alk is alkylene with 1–6 carbon atoms, and R₁ is selected from the group consisting of hydrogen and hydroxy.

3. A peptide of the formula:

A-L-Glu(Q)-D-His-L-Phe-Lys-Z in which the amino acid residue Lys is selected from the L- and D- configuration, and A is selected from the group consisting of H-L-Met, H-L-Met(→O), H-L-Met(→O₂), desamino-Met, desamino - Met(→O), desamino - Met(→O₂), and the moiety: H₂N-B-CO- in which B is alkylene having 1–6 carbon atoms;

Q is selected from the group consisting of OH and NH₂;

Z is selected from the group consisting of hydroxy, (N-β-indolyl-ethyl) amino, -L-Trp-OH, -L-Trp-Gly-OH, -L-Phe-OH, -L-Phe-Gly-OH, and (N-phenylalkyl) amino of the formula

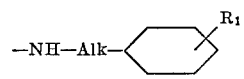

in which Alk is alkylene with 1–6 carbon atoms, and R₁ is selected from the group consisting of hydrogen and hydroxy.

4. A peptide of the formula:

A-Glu(Q)-His-X in which

A is selected from the group consisting of

H-L-Met(→O₂), desamino-Met, desamino-Met(→O), desamino-Met(→O₂), and β-Ala, and one of the amino acid radicals Glu(Q) or His is present in the D-form;

Q is selected from the group consisting of OH and NH₂;

X is selected from the group consisting of hydroxy, (N-phenylalkyl) amino of the formula

in which Alk is alkylene with 1–6 carbon atoms, and R₁ is selected from the group consisting of hydrogen and hydroxy; and -L-Phe-Y;

Y is selected from the group consisting of hydroxy, descarboxyl - lysyl, descarboxyl - arginyl, -L-Lys-Z, -D-Lys-Z, -L-Arg-Z and -D-Arg-Z;

Z is selected from the group consisting of hydroxy, (N-β-indolyl-ethyl) amino, -L-Trp-OH, -L-Trp-Gly-OH, -L-Phe-OH, -Phe-Gly-OH, and (N - phenylalkyl) amino of the formula

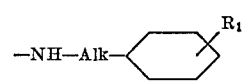

in which Alk is alkylene with 1–6 carbon atoms, and R₁ is selected from the group consisting of hydrogen and hydroxy.

5. Metal complexes of the peptides and peptide derivatives as claimed in claim 1.

References Cited
UNITED STATES PATENTS

| | | | |
|---|---|---|---|
| 3,479,333 | 11/1969 | Greven | 260—112.5 |
| 3,632,743 | 1/1972 | Geller et al. | 260—112.5 |
| 3,228,927 | 1/1966 | Kappeler et al. | 260—112.5 |

LEWIS GOTTS, Primary Examiner

R. J. SUYAT, Assistant Examiner

U.S. Cl. X.R.
424—177, 179